(12) United States Patent
Gruber et al.

(10) Patent No.: US 11,313,767 B2
(45) Date of Patent: Apr. 26, 2022

(54) TEST STAND FOR A CHAIN DRIVEN MOTORCYCLE AND METHOD OF TESTING A CHAIN DRIVEN MOTORCYCLE

(71) Applicant: AVL LIST GMBH, Graz (AT)

(72) Inventors: Hannes Gruber, Graz (AT); Johann Eitzinger, Graz (AT)

(73) Assignee: AVL List GmbH, Graz (AT)

( * ) Notice: Subject to any disclaimer, the term of this patent is extended or adjusted under 35 U.S.C. 154(b) by 255 days.

(21) Appl. No.: 16/495,272

(22) PCT Filed: Mar. 19, 2018

(86) PCT No.: PCT/AT2018/050003
§ 371 (c)(1),
(2) Date: Sep. 18, 2019

(87) PCT Pub. No.: WO2018/170523
PCT Pub. Date: Sep. 27, 2018

(65) Prior Publication Data
US 2020/0011764 A1    Jan. 9, 2020

(30) Foreign Application Priority Data
Mar. 21, 2017 (AT) .............................. A 50230/2017

(51) Int. Cl.
*G01M 17/007* (2006.01)

(52) U.S. Cl.
CPC .............................. *G01M 17/0076* (2013.01)

(58) Field of Classification Search
CPC ........................ G01M 17/0076; G01M 17/007
See application file for complete search history.

(56) References Cited

U.S. PATENT DOCUMENTS

| 3,686,776 A | 8/1972 | Dahl |
| 4,196,617 A | 4/1980 | Leone, Sr. |
| 5,429,004 A * | 7/1995 | Cruickshank ....... G01M 17/007 73/116.09 |

FOREIGN PATENT DOCUMENTS

| EP | 0498648 B1 | 2/1996 | |
| WO | 2005091250 A1 | 9/2005 | |
| WO | WO-2005091250 A1 * | 9/2005 | ........ G01M 17/0076 |

* cited by examiner

*Primary Examiner* — Eric S. McCall
*Assistant Examiner* — Timothy P Graves
(74) *Attorney, Agent, or Firm* — Dykema Gossett PLLC

(57) ABSTRACT

A motorcycle test stand comprises at least one dynamometer configured and arranged to be connected to a drivetrain of a motorcycle to be tested, and a receptacle configured and arranged for receiving a motorcycle frame, and a base fixing the dynamometer and the receptacle relative to one another. The receptable has first and second connecting points configured and arranged to be coupled to the motorcycle frame.

10 Claims, 4 Drawing Sheets

TEST STAND FOR A CHAIN DRIVEN MOTORCYCLE AND METHOD OF TESTING A CHAIN DRIVEN MOTORCYCLE

CROSS-REFERENCE TO RELATED APPLICATIONS

This application is a national stage filing based upon International PCT Application No. PCT/AT2018/050003, filed 19 Mar. 2018, which claims the benefit of priority to Austria application No. A 50230/2017, filed 21 Mar. 2017.

BACKGROUND

The invention relates to a motorcycle test stand having at least one dynamometer connectable to a drive chain of a motorcycle which is to be tested and a receptacle for a motorcycle frame, wherein the dynamometer and the receptacle are fixed to a base of the motorcycle test stand.

Usually the dynamometer is connected for power measurement directly via the motorcycle sprocket. The chain is not included in this. The consequence of this is that no statements can be made about the highly dynamic chain in these test arrangements.

Typically, motorcycles are either tested on roller test stands or the motorcycle sprocket is directly connected to a dynamometer and loaded.

The problem with roller test stands is that, for example, losses due to the tires or the slipping of the wheels on the rollers of the roller test stand result in errors in the evaluation of the motorcycle to be tested. The rollers also cause unwanted vibrations during the test, which falsify the test results.

From U.S. Pat. No. 4,196,617 A, a motorcycle test stand is known, with which the rear wheel is removed and the drive chain is connected via a transmission to a dynamometer and thus for example a power measurement is accomplished. The drive chain is only subjected to a defined load by the dynamometer and not by the rear swing arm. Therefore, the real load on the drive chain cannot be simulated by the test stand shown. Furthermore, to simulate an uphill ride with the illustrated motorcycle test stand, the forces cannot be applied realistically to the motorcycle.

SUMMARY OF THE INVENTION

It is the object of the present invention to provide a motorcycle test stand that eliminates these disadvantages and in which the loads on the drive chain on the motorcycle test stand correspond to the loads during real driving.

This object is solved according to the invention by means of an initially mentioned motorcycle test stand, which has a first connecting point and a second connecting point to the motorcycle frame. The first connecting point is especially a swing arm bearing of the motorcycle.

This means that not only the dynamometer acts on the drive chain, but the force from the rear swing arm can also be applied to the drive chain, as the motorcycle is movable relative to the dynamometer, which is not possible with a fixed rear swing arm (when only the rear wheel is removed and the dynamometer is connected to the drive chain, as known from the prior art).

The present invention now makes it possible to load a motorcycle via a dynamometer and to make statements about the properties of the chain in operation. It is thus possible to simulate various driving maneuvers such as an uphill drive, the lifting off of the front wheel or various loading situations, in which the corresponding forces are applied to the motorcycle by an actuator.

In addition, the invention relates to a method for testing a motorcycle on a motorcycle test stand in which a drive chain of the motorcycle is connected to a dynamometer of the motorcycle test stand and the motorcycle is fixed in a receptacle of the motorcycle test stand and the motorcycle is tested by loading with the dynamometer, wherein in particular forces and moments are simulated by an actuator during travel, wherein a motorcycle frame is mounted in the receptacle at a first connecting point and the motorcycle frame is connected to the receptacle at a second connecting point.

This gives rise to the advantage that disturbing influences from rollers do not occur. Losses due to the wheel and slipping do not occur. Furthermore, influences on the drive chain and its behavior, elongation and much more can be tested. Furthermore, due to the absence of the rear swing arm and the rear wheel, tests can be started at an early stage of development and the interaction of various components can be observed.

Relative movements of the motorcycle frame to the drive chain and to the rear wheel swing arm can be advantageously simply taken into account, if the motorcycle frame is rotatable around the first connecting point in the receptacle.

This means that the drive chain can be tested under real driving conditions. This creates a condition via the first connecting point that is equivalent to a real swing arm of the motorcycle and can nevertheless be tested at a very early stage of development, for example, without having to build a costly prototype swing arm.

It is favorable if the motorcycle dynamometer has a test damper and/or a test spring from the second connecting point to the motorcycle frame. Influences of the motorcycle test stand on the motorcycle can be taken into account or eliminated and the result is thus improved.

It is particularly advantageous if at least one sprocket of the motorcycle to be tested is directly connected to the dynamometer via a drive chain and a chainring.

To simulate the forces and moments on a front wheel of the motorcycle, it is advantageous if a front wheel dynamometer can be connected to the motorcycle frame via a front receptacle.

In order to be able to take forces on the front wheel into account, it is advantageous to remove it and then connect the motorcycle frame to a front wheel dynamometer via a front receptacle, and to simulate forces and moments on the front wheel during the test.

BRIEF DESCRIPTION OF THE DRAWINGS

The invention is explained in more detail using the non-restrictive figures, wherein.

DETAILED DESCRIPTION

Figure 1:
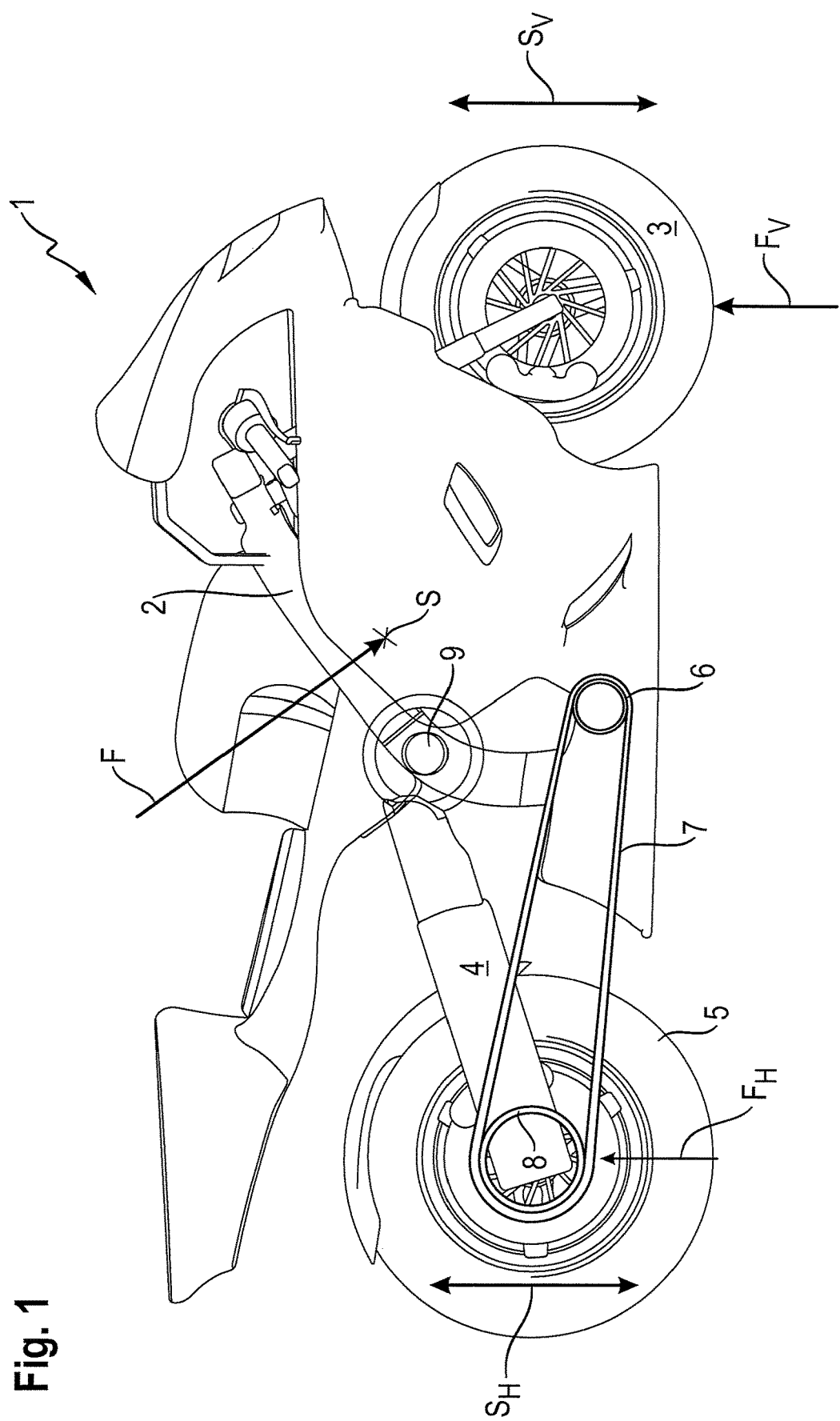
FIG. 1 shows forces on a motorcycle during real travel.

FIG. 1 shows a motorcycle 1 during real travel. Motorcycle 1 has a motorcycle frame 2, a front wheel 3 connected thereto and a rear swing arm 4 connected to the rear wheel frame 2, which in turn is connected to the rear wheel 5. A motor (not shown) is connected to the rear wheel 5 via a sprocket 6, a drive chain 7 and a chainring 8. The front wheel 3 is movable by a front path $S_V$ and the rear wheel 5 is movable by a rear path $S_H$, which is ensured in real driving by spring and damping elements. While driving, a resulting force F acts through drive, driving resistance and other variables on a center of gravity S. From an underground a front force $F_V$ acts on the front wheel 3 and a rear force $F_H$ on the rear wheel 5.

Figure 2:
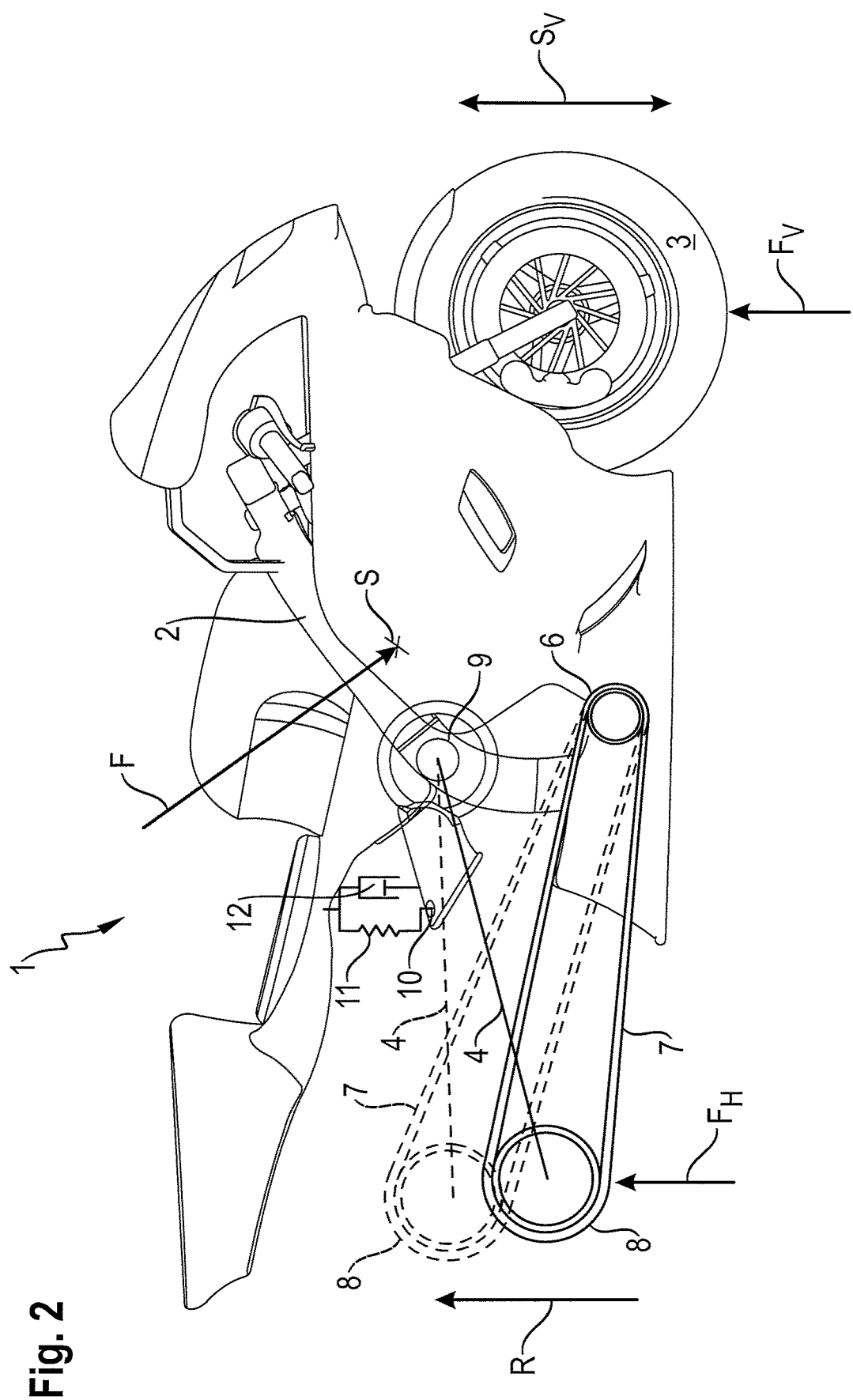
FIG. 2 shows a motorcycle with a deformed drive chain during real travel.

FIG. 2 shows the displacements of the drive chain 7 and the rear swing arm 4 during real driving. A resultant R acts on the drive chain 7 from the rear wheel 5 and from the rear wheel swing arm 4, which results from the acceleration of the motorcycle. Due to the displacement and the forces acting on the drive chain, there are differences between the real drive and the measurements on a test stand, as known from the prior art.

Figure 3:
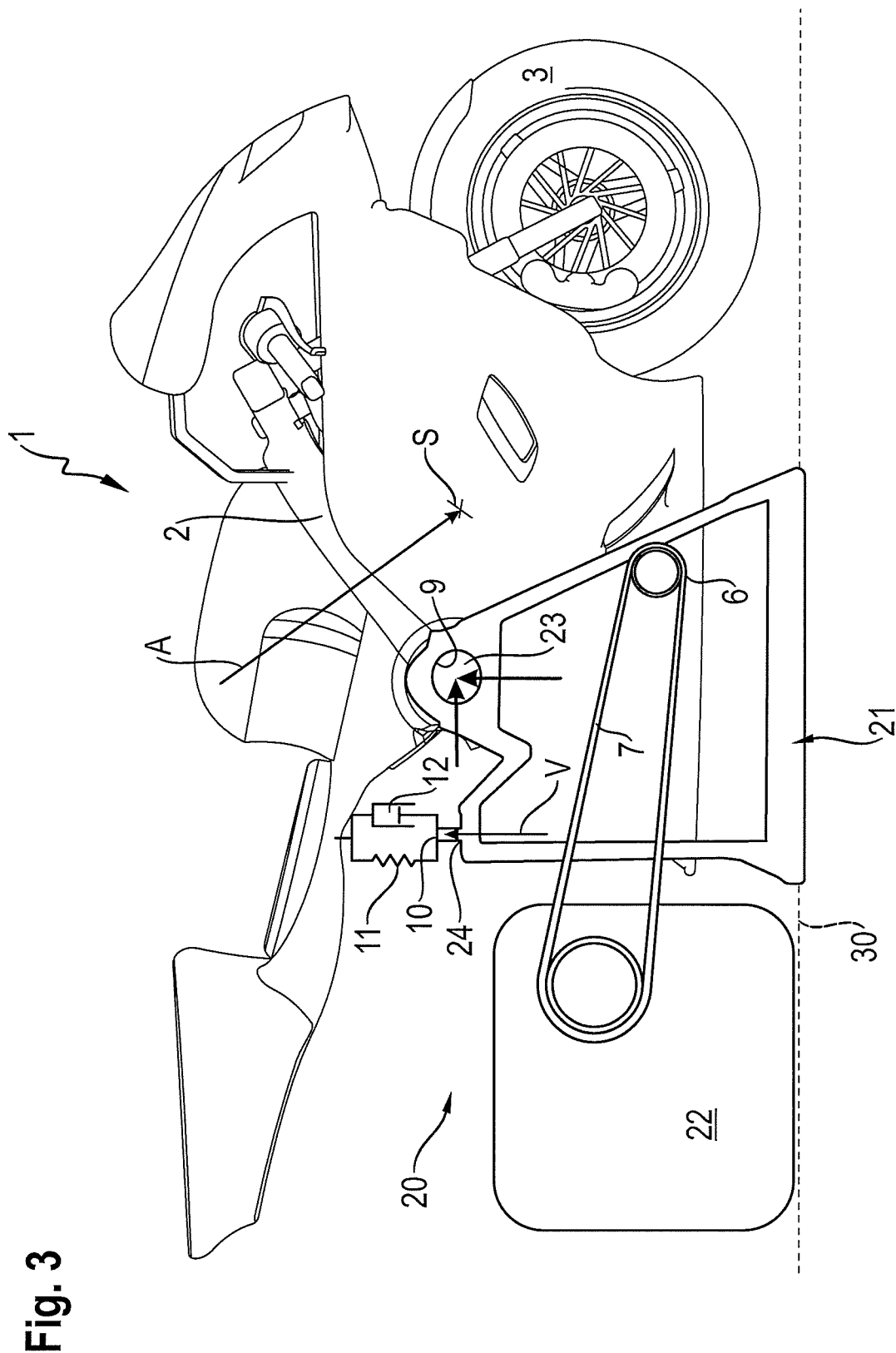
FIG. 3 shows a first embodiment of a motorcycle test stand according to the invention.

These differences do not occur with a motorcycle test stand 20 as shown in FIG. 3. The motorcycle test stand 20 has a receptacle 21 for the motorcycle frame 2 and a dynamometer 22. Both the receptacle 21 and the dynamometer 22 are fixed to a base (30) of the motorcycle test stand (20). External forces A can be applied to motorcycle 1 by means of an actuator (not shown).

Receptacle 21 has a first receptacle location 23 and a second receptacle location 24. The first receptacle location 23 can be connected to a first connecting point 9 and the second receptacle location 24 to a second connecting point 10. The first connecting point 9 of the motorcycle frame 2 acts where normally a rear swing arm 4 would act on the motorcycle frame 2. On the test stand according to the invention, the receptacle 21 of the motorcycle test stand 20 is connected to the motorcycle frame 2 at this point. The first connecting point 9 is a swing arm bearing. The second connecting point 10 connects the motorcycle frame 2 via a spring 11 and/or a damper element 12 to the receptacle 21 of the motorcycle test stand 20.

In the first receptacle location 23 the motorcycle frame 2 is rotatably mounted. A vertical and a horizontal displacement are locked. A vertical force V is exerted on the second receptacle location 24 via the motorcycle frame 2 or via the spring 11 and/or damper element 12, which is dependent on the one hand on the weight force of the motorcycle and on the other hand on the force applied by the engine during acceleration, for example. The drive chain 7 can be connected to the dynamometer 22 of the motorcycle test stand 20 via a chainring 8.

Figure 4:
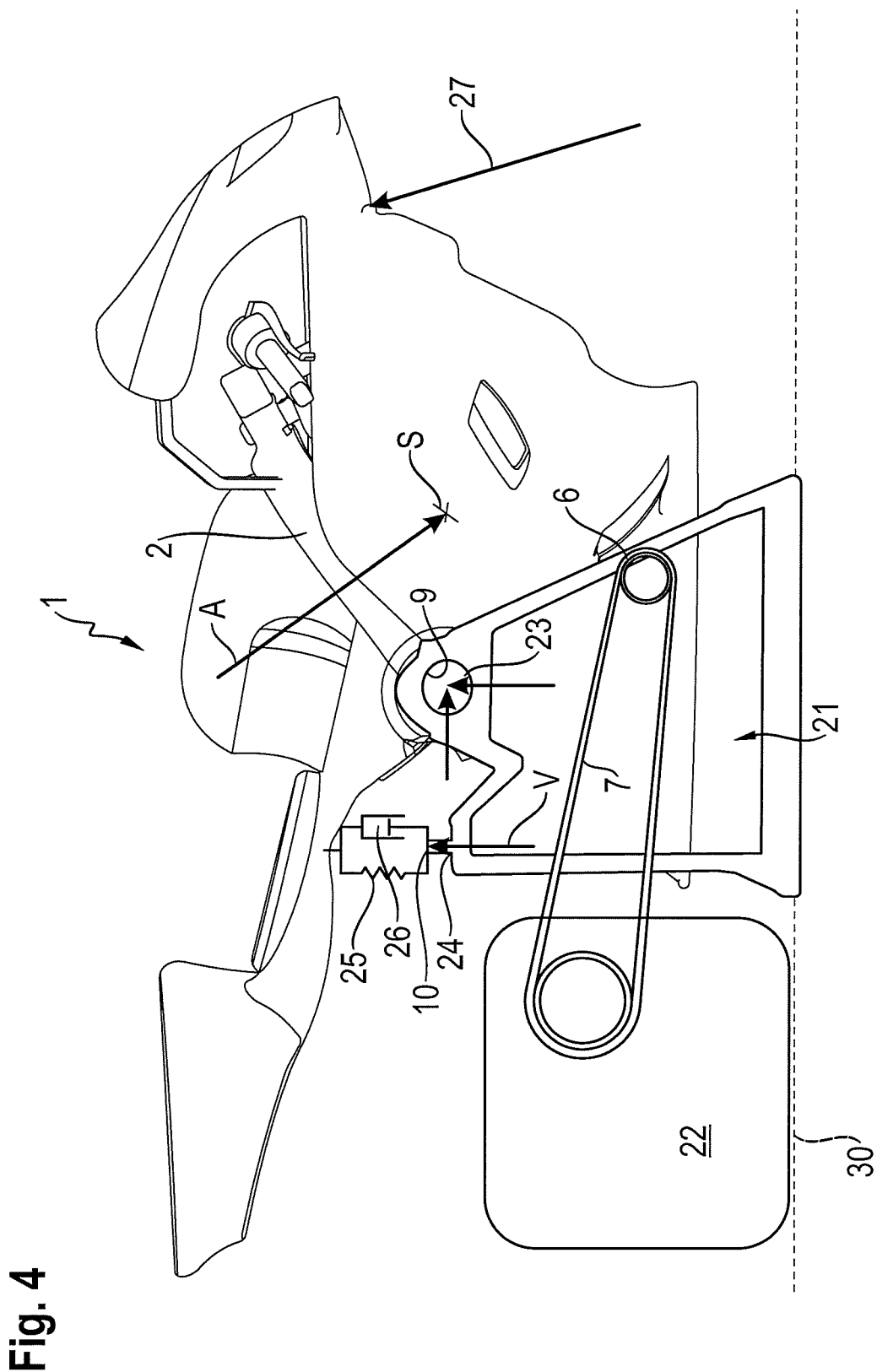
FIG. 4 shows a second embodiment of a motorcycle test stand according to the invention.

FIG. 4 shows a second embodiment of the motorcycle test stand 20. Instead of a spring 11 and/or a damper element 12 of motorcycle 1, a test spring 25 and/or a test damper 26 of motorcycle test stand 20 are provided. Instead of the front wheel 3, the motorcycle frame 2 is connected to a front wheel dynamometer 27 (not shown) of a front receptacle.

To test motorcycle 1, as shown in FIG. 3, motorcycle 1 is mounted without rear wheel 5 and without rear wheel swing arm 4 in the receptacle 21 of motorcycle test stand 20. The motorcycle frame 2 is connected with its first connecting point 9, its swing arm bearing and its second connecting point 10 to the first receptacle location 23 and the second receptacle location 24 of the receptacle 21 of the motorcycle test stand 20.

The drive chain 7 of the motorcycle 1 is connected to the dynamometer 22 of the motorcycle test stand 20 and finally the motorcycle 1 is tested with the motorcycle test stand 20. An external force A is applied by the actuator to the center of gravity S of the motorcycle 1.

In an alternative variant, before the test, spring 11 and/or damper elements 12 of motorcycle 1 are replaced by test spring 25 and test damper 26. Furthermore, it is possible to replace the front wheel 3 with a front receptacle and to load the motorcycle 1 with a front wheel dynamometer 27. Thus forces and moments on the front wheel 3 can be simulated during real driving.

The invention claimed is:

1. A motorcycle test stand comprising:
   at least one dynamometer configured and arranged to be connected to a drive chain of a motorcycle to be tested wherein the motorcycle has a rear wheel removed;
   a receptacle configured and arranged for receiving a motorcycle frame;
   a base fixing the dynamometer and the receptacle relative to one another wherein the receptacle has a first connecting point and a second connecting point configured and arranged to be coupled to the motorcycle frame; and
   a test damper and/or a test spring configured and arranged to extend between the second connecting point and the motorcycle frame;
   wherein the motorcycle frame is rotatably mounted about the first connecting point in the receptacle.

2. The motorcycle test stand according to claim 1, wherein the dynamometer, via a drive chain and a chainring, is configured and arranged to be operatively connected to at least one sprocket of the motorcycle to be tested.

3. The motorcycle test stand of claim 2, further including a front wheel dynamometer configured and arranged for simulating the forces and moments on a front wheel of the motorcycle, is connected to the motorcycle frame via a front receptacle.

4. The motorcycle test stand according to claim 1, further including a front wheel dynamometer configured and arranged for simulating the forces and moments on a front wheel of the motorcycle, is connected to the motorcycle frame via a front receptacle.

5. A method for testing a motorcycle on a motorcycle test stand, the method including the following steps:
   connecting a drive chain of the motorcycle to a dynamometer of the motorcycle test stand;
   fixing the motorcycle in a receptacle of the motorcycle test stand by mounting the motorcycle frame to a first connecting point in the receptacle, and connecting the motorcycle frame to the receptacle via a second connecting point;
   removing a front wheel from the motorcycle, and connecting the motorcycle frame, via a front receptacle, to a front wheel dynamometer, and simulating forces and moments on the front wheel during the testing of the motorcycle; and
   testing the motorcycle by loading the drive chain using the dynamometer.

6. The method according to claim 5, further including the step of rotatably mounting the motorcycle frame at the first connecting point.

7. The method of claim 6, further including the step of connecting the motorcycle via a test damper and/or a test spring to the second connecting point of the motorcycle test stand.

8. The method according to claim 5, further including the step of connecting the motorcycle via a test damper and/or a test spring to the second connecting point of the motorcycle test stand.

9. A method for testing a motorcycle on a motorcycle test stand, the method including the following steps:

removing the rear wheel of the motorcycle;
connecting a drive chain of the motorcycle to a dynamometer of the motorcycle test stand;
fixing the motorcycle in a receptacle of the motorcycle test stand by mounting the motorcycle frame to a first connecting point in the receptacle, and connecting the motorcycle frame to the receptacle via a second connecting point;
rotatably mounting the motorcycle frame at the first connecting point;
connecting the motorcycle via a test damper and/or a test spring to the second connecting point of the motorcycle test stand; and
testing the motorcycle by loading the drive chain using the dynamometer.

10. A motorcycle test stand comprising:
at least one dynamometer configured and arranged to be connected to a drive chain of a motorcycle to be tested;
a receptacle configured and arranged for receiving a motorcycle frame;
a base fixing the dynamometer and the receptacle relative to one another wherein the receptacle has a first receiving point and a second receiving point, wherein the first receiving point is connectable with a first connecting point to the motorcycle frame and the second receiving point with a second connecting point to the motorcycle frame;
wherein the motorcycle frame is rotatably mounted about the first receiving point in the receptacle, and the first receiving point engages the motorcycle frame at a point where the motorcycle frame normally connects to a rear swing arm; and
a test damper and/or a test spring from the second receiving point to the motorcycle frame.

* * * * *